United States Patent
Linden

(10) Patent No.: US 10,278,492 B2
(45) Date of Patent: May 7, 2019

(54) PIECE OF DISPLAY FURNITURE FOR DISGLAYING GOODS

(71) Applicant: Michael Linden, Boitze (DE)

(72) Inventor: Michael Linden, Boitze (DE)

( * ) Notice: Subject to any disclaimer, the term of this patent is extended or adjusted under 35 U.S.C. 154(b) by 111 days.

(21) Appl. No.: 15/118,487

(22) PCT Filed: Feb. 12, 2015

(86) PCT No.: PCT/EP2015/000310
§ 371 (c)(1),
(2) Date: Aug. 12, 2016

(87) PCT Pub. No.: WO2015/120985
PCT Pub. Date: Aug. 20, 2015

(65) Prior Publication Data
US 2017/0181539 A1 Jun. 29, 2017

(30) Foreign Application Priority Data
Feb. 12, 2014 (DE) .................... 20 2014 100 622 U

(51) Int. Cl.
*A47B 47/00* (2006.01)
*F16B 12/12* (2006.01)
(Continued)

(52) U.S. Cl.
CPC ...... *A47B 47/0041* (2013.01); *A47B 47/0091* (2013.01); *A47F 3/004* (2013.01);
(Continued)

(58) Field of Classification Search
CPC ............ A47B 47/0041; A47B 47/0091; A47B 2230/07; A47B 2230/16; A47B 2096/209;
(Continued)

(56) References Cited

U.S. PATENT DOCUMENTS 2,981,669 A * 4/1961 Brand ...................... G21C 3/36
29/521
3,181,923 A * 5/1965 Guillon ................ A47B 17/006
108/148
(Continued)

FOREIGN PATENT DOCUMENTS

CN 202 732 567 2/2013
DE 101 09 590 9/2002
(Continued)

*Primary Examiner* — Hiwot E Tefera
(74) *Attorney, Agent, or Firm* — Gudrun E. Huckett

(57) ABSTRACT

A piece of furniture, in particular in the form of a piece of display furniture and preferably in the form of a piece of display furniture for displaying goods, further preferably a piece of modular-construction furniture in the form of a rack or cabinet, comprising a plurality of furniture elements, designed preferably as display-furniture elements, in the form of surface-area elements (1, 2) and connecting elements (4), it being possible for the latter to be fitted on narrow sides of the surface-area elements (1, 2), wherein the connection on the narrow sides, it being possible for said connection to be released without the use of tools, takes place via a tongue structure which can be introduced into a groove structure, preferably via a tongue which can be introduced into a groove or via a multiple tongue, designed at least in the form of a double tongue, which can be introduced into a multiple groove, designed at least in the form of a double groove, and wherein the furniture elements (1, 2, 4) are secured via the groove/tongue connection in a direction transverse to the surface-area extent of the surface-area element (1, 2) and, in addition, counter to the direction of introduction via the interaction of at least one magnet (6), arranged on one furniture element, and of a further magnetically attractable part, arranged on the adjacent furniture element, such that two surface-area elements (2, 1) which (Continued)

are arranged one beside the other or directly at a corner are connected via just one connecting element (4).

27 Claims, 7 Drawing Sheets

(51) Int. Cl.
  *F16B 12/46* (2006.01)
  *A47F 3/00* (2006.01)
  *A47F 5/00* (2006.01)
  *A47F 5/10* (2006.01)

(52) U.S. Cl.
  CPC .............. *A47F 5/0018* (2013.01); *A47F 5/10* (2013.01); *F16B 12/125* (2013.01); *F16B 12/46* (2013.01); *A47B 2230/07* (2013.01); *A47B 2230/16* (2013.01); *F16B 2012/466* (2013.01)

(58) Field of Classification Search
  CPC .. F16B 12/46; F16B 12/125; F16B 2012/466; F16B 2001/0035; A47F 5/0018; A47F 5/10; A47F 3/004
  USPC ..... 312/111, 107, 108, 257.1, 140, 114, 263, 312/265.2, 265.3, 265.5, 265.4; 211/186, 211/189, 188, 128, 195, 194
  See application file for complete search history.

(56) References Cited

U.S. PATENT DOCUMENTS

| | | | | | |
|---|---|---|---|---|---|
| 3,410,474 | A | * | 11/1968 | Keil | B65D 81/056 206/453 |
| 3,841,725 | A | * | 10/1974 | Dorner | A47B 87/00 312/107 |
| 3,874,753 | A | * | 4/1975 | Naito | A47B 47/0041 211/186 |
| 3,991,535 | A | * | 11/1976 | Keller | E04O 3/14 403/364 |
| 4,021,089 | A | * | 5/1977 | Bush | A47B 47/042 312/111 |
| 4,125,338 | A | * | 11/1978 | Lew | A47B 47/0041 312/263 |
| 4,195,462 | A | * | 4/1980 | Keller | E04O 3/14 52/690 |
| 4,270,324 | A | * | 6/1981 | Schaefer | A47B 47/042 52/284 |
| 4,676,038 | A | * | 6/1987 | Doyon | A47B 47/0041 403/231 |
| 5,402,738 | A | * | 4/1995 | Carr | A47F 5/10 108/157.1 |
| 5,470,139 | A | * | 11/1995 | Hsiao | A47B 47/005 312/111 |
| 5,647,181 | A | * | 7/1997 | Hunts | A63H 33/10 312/111 |
| 6,536,147 | B1 | * | 3/2003 | Funk | E04B 2/7425 40/605 |
| 6,543,164 | B1 | * | 4/2003 | Sperl | G09F 15/0068 40/605 |
| 6,553,724 | B1 | * | 4/2003 | Bigler | A47F 5/10 160/135 |
| 6,899,404 | B1 | * | 5/2005 | King | A47B 87/008 312/111 |
| 7,677,830 | B1 | * | 3/2010 | Brown | A47C 3/00 312/140 |
| 8,282,307 | B1 | * | 10/2012 | Brown | A47C 3/00 297/440.1 |
| 8,641,155 | B2 | * | 2/2014 | Lee | A47B 47/005 312/108 |
| 2004/0075371 | A1 | * | 4/2004 | Latchinian | A47F 3/001 312/140 |
| 2010/0019630 | A1 | * | 1/2010 | Leng | A47B 47/0075 312/107 |
| 2013/0057125 | A1 | * | 3/2013 | Ma | F16B 12/2036 312/108 |
| 2015/0086260 | A1 | * | 3/2015 | Turnipseed | F16B 12/44 403/205 |
| 2015/0162143 | A1 | * | 6/2015 | Ambrosat | H01H 1/58 403/381 |

FOREIGN PATENT DOCUMENTS

| | | |
|---|---|---|
| JP | S48-67920 | 8/1973 |
| JP | S52-75517 | 6/1977 |

* cited by examiner

PIECE OF DISPLAY FURNITURE FOR DISGLAYING GOODS

BACKGROUND OF THE INVENTION

The present invention concerns furniture, especially presentation furniture, preferably presentation furniture for merchandise, more preferably modularly constructable furniture in the form of a shelf or cabinet, comprising a plurality of furniture elements in the form of surface elements and connecting elements, which can be mounted on narrow sides of the surface elements.

Furniture for merchandise, especially trade show shelving systems, is rather well known in the prior art. Examples of this which can be mentioned here are DE 10 109 590 B4 as well as U.S. Pat. No. 6,553,724 B1.

Even though the prior art also arrives at an easy assemblability of a display stand, the multitude of parts used and especially the connection of the surface elements being arranged next to each other or across a corner, in order to form a compartment for example, is still relatively large. In addition, screw connections need to be loosened or tightened, and a multitude of connecting elements forming the connection need to be combined and connected with each other.

Therefore the problem which the present invention proposes to solve is to simplify the handling of furniture which can be used in particular as presentation furniture (for example usable at trade shows), preferably in the manner of a cabinet or a shelf, and to likewise make possible a plurality of different design possibilities.

SUMMARY OF THE INVENTION

The problem is solved by furniture, especially in the form of presentation furniture and preferably as presentation furniture for merchandise, more preferably modularly constructable furniture in the form of a shelf or cabinet, comprising a plurality of furniture elements designed preferably as presentation furniture elements in the form of surface elements and connecting elements, which can be mounted on narrow sides of the surface elements, wherein the tool-free detachable connection at the narrow sides occurs via a tongue structure to be inserted into a groove structure, preferably via a tongue to be inserted into a groove or via a multiple tongue configured at least as a double tongue to be inserted into a multiple groove configured at least as a double groove, and wherein the furniture elements are secured by the tongue and groove connection transversely to the area dimension of the surface element and additionally against the direction of insertion thanks to the interaction of at least one magnet arranged on a furniture element and a magnetically attractable other part arranged on the adjacent furniture element, such that two surface elements next to each other or arranged directly across a corner are joined by only one connecting element. Advantageous embodiments of the invention will be found in the dependent claims referring to this claim, as well as the following description of the figures.

The furniture for merchandise according to the invention, especially modularly constructable furniture in the form of a shelf or cabinet, is distinguished in that it has a plurality of furniture elements in the form of surface elements and connecting elements, wherein the connecting elements can be mounted on narrow sides of the surface elements, wherein the tool-free detachable connection at the narrow sides occurs via a tongue structure to be inserted into a groove structure, preferably via a tongue to be inserted into a groove or via a multiple tongue configured at least as a double tongue to be inserted into a multiple groove configured at least as a double groove, and wherein the furniture elements are secured by this tongue and groove connection transversely to the area dimension of the surface element and additionally against the direction of insertion thanks to the interaction of at least one magnet arranged on the one furniture element and a magnetically attractable other part arranged on the adjacent furniture element, such that two surface elements next to each other or arranged directly across a corner are joined to each other along the shortest connection by only (exactly) one connecting element. This also includes variants in which several connecting elements are arranged next to each other, i.e., adjoining each other at their end faces to cover the end face or narrow sides of a surface element. Such furniture or piece of furniture can be used both in the private domain, such as shelf or cabinet in living rooms or bedrooms, as well as in the commercial domain. Thus, application options exist, for example, in the construction of display booths or shops, or in offices.

Tool-free means here in particular for a person constructing the furniture that they can manually join together the individual elements of the furniture and also manually dismantle them. The connection occurs by the connecting elements and surface elements adjoining the groove structure or tongue structure, which are additionally attracted to each other by a magnet and its mating part. This connection thanks to the friction of the tongue structure in the groove structure, especially the multiple tongue in the multiple groove, and also thanks to the magnetic interaction is sufficiently strong for the construction of furniture of usual sizes. Of course, a multiple groove generally has as many grooves as the multiple tongue has tongues, but also for example a multiple groove designed as a 4-fold groove can engage with a multiple tongue designed as a double tongue.

By a double groove is meant two grooves extending in the direction of the lengthwise dimension of the furniture element, especially in parallel. Similarly, a double tongue is formed by two tongues, e.g., in the form of webs, extending in the lengthwise direction of the furniture element. Both the groove structure and the tongue structure can be partly interrupted, for example, in order to make possible the arrangement of additional furniture elements. Instead of having precisely two tongues or grooves, the invention also encompasses example embodiments with multiple grooves or tongues, i.e., variants having three or more grooves or tongues alongside each other. In the most simple case, the groove structure can have only one optionally interrupted groove and the tongue structure then accordingly only one optionally interrupted tongue. The direction of insertion is a direction parallel to the area dimension of the surface element and in particular perpendicular to an end face of the surface element.

Preferably, a magnet is arranged both on the connecting element and on the surface element. This can be, for example, a neodymium magnet.

In particular, the magnets have a smaller cross-sectional width than the connecting element. This has the advantage that the surface elements and connecting elements can be shoved into and along each other over a broad range without forces of attraction being produced already by the preferably cylinder-shaped magnets. These act only in the immediate vicinity of the magnets to each other, which substantially facilitates the assembly of the furniture as compared to the prior art, in which strip-shaped magnets are present.

Preferably, the connecting element has a tongue structure on at least one side, preferably a multiple tongue. On at least one other side there can be another means of connection, for example, for arranging a glass panel, or also another tongue structure, especially a multiple tongue. While the multiple tongue, which engages with a corresponding multiple groove of an adjacent furniture element, can generally also be present on the surface element, the arrangement of the multiple tongue on the connecting element has the advantage that the connecting elements can then be designed more narrow in regard to the parts visible in the assembled state.

For a better insertability into the end faces of a surface element preferably provided with multiple grooves, a double tongue or the two single tongues of the double tongue is/are beveled toward their ends. The same also holds for any multiple tongues or a single tongue of a tongue structure.

Advantageously, the connecting element is provided with a polygonal base body, especially a cuboidal one, wherein the base body preferably has a square design in cross section transversely to its lengthwise dimension and in regard to an envelope. By base body is meant here the body of the connecting element without the tongue structure, for example, such as especially the multiple tongues. For a symmetrical joining of surface elements being joined with the connecting element both across a corner and not across a corner, it is advantageous for the base body, preferably made of wood, plastic, or aluminum, to be square. The connecting element with the exception of the respective magnets and its, for example adhesive-based coating can likewise be made of wood, plastic or aluminum and optionally additionally varnished, pickled, or otherwise refined. This produces a pleasant feel, low manufacturing costs, and easy processability and workability. Alternatively, the base body can also be made of MDF and another composite material, especially a wood/plastic composite material. The surface elements can additionally have photoprinted fabrics or glued elements in the form of films or thin fiberboards. These can also be placed on the surface elements for example by detect or hook connections (such as hook and loop connections). For example, a surface element can also merely form a frame for a fabric and be provided with a fabric. The surface elements, just like the connecting elements, can consist at least substantially (with the exception of the magnets) of wood, wood composites, metal, plastic, or composites consisting of one or more of these materials, such as wood composites or WPC (wood-plastic composite). The individual parts of the furniture according to the invention can be produced carved out from raw material or also be made by injection molding or casting. In particular, a good combination of feel and strength with precise manufacture at the same time results from a bamboo injection molding process.

For the joining of one surface element to another surface element, the connecting element is provided with a tongue structure, especially a multiple tongue, on the sides respectively facing the end faces of the surface element and/or the magnet on the respective side of the connecting element is arranged symmetrically to the tongue structure, i.e., especially with its central longitudinal axis in the middle between the tongues when the tongues of the tongue structure have an even number. Thus, the connecting element has one tongue structure at least on two sides. In an arrangement of three or four surface elements at the connecting element, tongue structures in the form of preferably multiple tongues are accordingly present on three or four sides.

Thanks to the symmetrical disposition of the magnet with respect to the multiple tongues, for example in the gap between two tongues of a double tongue, the connecting element can be mounted regardless of the side. This holds in particular for magnets which are arranged in the middle in relation to a base element.

The length of the connecting elements can likewise vary, as can the length of the surface elements. What is important here is that the distances of the magnets from the outer sides or the outside end faces are such that they match up with the opposite magnets on the connection partner.

A basic connector has a length $D=A-V$, where V is the cross-sectional width of another connecting element. Depending on the designs of the connector, it can have the lengths $A-V$, $A$, or $A+V$, where a connector of length $A+V$ in the connection with a surface element has end regions projecting at both ends and adjoining the region with tongues, the projections being large enough so that a surface element can be enclosed by a frame of connecting elements on all sides.

The next longer connecting element according to this length function initially has a length of $2\,A-V$, $2\,A$, or $2\,A+V$, depending on whether it has predetermined end regions which cover the end faces of adjoining connecting elements.

The smallest connecting element likewise has only one magnet, which is arranged in the middle. In the next longer connecting element, two magnets are then accordingly especially present, while the tongue structure, especially the multiple tongue, is interrupter here in the middle or staggered by $½V$, in order to make possible additional surface elements being mounted at least on roughly half of the connecting element.

The edge length of the surface elements turns out to be here $1\,A-V$ for a square plate in top view (basic element), which being the smallest module size is then provided with a groove structure, especially a multiple groove, on all four sides. The next longer surface elements are then $2\,A-V$, $3\,A-V$, and $4\,A-V$ ($n\cdot A-V$, with whole-number $n=1, 2, 3, 4, 5, \ldots$). Magnets present in the narrow sides in the surface element that can be used as the basic element are arranged centrally, symmetrically in regard to the groove structure, especially the multiple grooves, and equally far apart from the corners. The next larger variants then have n magnets on a narrow side according to the preceding rule.

Preferably, the magnet is recessed into the base body in the connecting element, wherein it can terminate flush with the surrounding surface. In particular, the magnet is recessed in a region in which webs are close to one another on the connecting element. It can therefore be advantageous for the groove structure designed in particular as a double tongue or multiple tongue around the magnet to have recesses running toward the magnet, wherein especially the groove surfaces forming the recess is configured as guide surfaces, so that another magnet which is arranged on the surface element is led toward the magnet or the connecting or closing element is positioned precisely relative to the magnet of the surface element. Accordingly, the tongues (e.g., double tongues) are interrupted and not necessarily designed as continuous webs or only as continuous webs partly with reduced height.

In addition, hollow cylindrical entry regions can be present adjoining the guide surfaces, whose diameter is only slightly larger than the width of cylindrical magnets (<3 mm difference).

Moreover, it works to the advantage of the furniture according to the invention when the connecting element is provided with a recess in which a current conducting line is arranged.

The functionality of the furniture according to the invention is furthermore improved if connection means for connecting to a current conducting line are present on at least one of the end faces of the connecting element. This can be terminals or plugs, in particular.

Preferably, one or more of the furniture elements are provided with a lighting means preferably designed as an LED strip. Accordingly, the display space can be illuminated. In particular, this furniture element is a closing element as described further below, which lights up the space located behind the closing element from the perspective of the observer, so that the illumination of the display object occurs on the part of the viewer and thus advantageously for his viewing.

As already described above, the connecting element is provided, as connecting means of two surface elements provided across a corner, with a tongue structure, especially multiple tongues, located respectively on mutually adjacent sides. Across a corner generally means a 90° corner, but there can also be connection means which are polygonal in cross section, which connect surface elements with angles larger than or smaller than 90°. In the case of surface elements provided with surfaces passing flush into each other and accordingly arranged alongside each other, the connecting element is provided with multiple tongues situated on opposite sides for the connecting of these two surface elements.

For the integration of a door or hatch, the connecting element can be provided with a fitting for this. For an improved absorbing of the torque, the connecting element which is then provided with a fitting can be additionally dowelled to another connecting element, for which corresponding recesses can be present in the connecting elements for the placement of a dowel.

As described above, a surface element has in particular a polygonal, preferably a cuboidal basic shape, with the above-described length relations applying.

The thickness of the surface element corresponds to the cross-sectional width of a base body of a connecting element. Accordingly, the individual connecting elements and surface elements interchangeably fit the respective other connecting partner.

As described above, the surface element preferably has a groove structure, especially a multiple groove, on at least one, but especially on all of its end faces or narrow sides. This groove structure, especially multiple grooves, can run in particular up to the corners of the surface elements.

Preferably, a central web situated between the grooves is provided with a magnet, which can be designed flush with the web in terms of height. This web can have a complementary shape in terms of the design to a groove running between the double tongues of the connecting element, for example.

The magnet in particular is broader in configuration than the web, i.e., it thus extends more into the space formed by the grooves than does the rest of the web. In combination with an entry region on the connecting element, such an embodiment can result in an easier adaptation and a more accurate positioning of the presentation to furniture elements. The connecting element in the magnetically retained position depending on the width of the magnet cannot slip in the lengthwise direction of the channel located between the webs of the connecting element. Thus, the connecting element is retained in all three spatial directions. For a tongue structure with only one viewed in the lengthwise direction, it can be advantageous for the magnet to also have a smaller width.

The functional diversity of furniture according to the invention is further improved when the surface element is at least partly transparent in design. Alternatively or additionally, a furniture element can have a groove and/or a recess for the arrangement of a functional element, especially a glass plate, another plate covered with a film, a monitor or similar functional element filling up the surface of the recess.

Another furniture element of the furniture according to the invention is designed as a closing element, which is configured without tongues and grooves on a side to be facing an observer. In particular, the surface element configured with a groove or tongue profile is covered by such a closing element at the front side to be defined as the front side in relation to the observer. As described above, such a closing element can also have lighting means, in particular.

Preferably, the closing element is provided with a tongue structure the same as a connecting element, especially a multiple tongue, which is beveled in particular toward the ends of the tongue, in order to make possible a miter arrangement in the corner regions of the one surface element. Thus, the tongues provided with bevels involve bevels as a result of tongues lying against each other in a miter. Alternatively, instead of a beveling, the tongue can also be shortened.

Just like with the connecting elements, the tongues can run as far as the end faces or end edges of the closing element and a polygonal base body, especially a cuboidal base body which is square in cross section can be involved here. However, the closing elements can also have corner regions which project.

The groove structure and the tongue structure shall be described below substantially as variants in the form of double grooves and tongues. However, the invention also encompasses variants which have more than two grooves or tongues alongside each other on an end face or a longitudinal side of a connecting element or closing element, or also only one groove and one tongue.

In another advantageous configuration of the invention, the furniture is provided with a plurality of connecting elements and a surface element enclosed by them, wherein at least one connecting element has a region adjoining the tongue whose length V corresponds to the cross-sectional width of the base body of the connecting element or closing element. This then produces a margin of equal length running around the surface element.

A magnet of the connecting element or the surface element in particular is smaller in terms of its cross-sectional width than the width V of the connecting element. For example, the magnet can be preferably cylindrical in design.

Preferably, a furniture element provided with at least one roller and designed to be arranged at the bottom side is provided with a double groove for the arranging of additional furniture elements, wherein at least one magnet is disposed in the web between the two grooves. At the same time, the double groove is disposed in particular on a side of the furniture element, which then has a sheetlike form, which is opposite the roller.

Several furniture elements provided with rollers can be connected with wooden webs, which are provided with a double groove, wherein at least one magnet is disposed in the web between the two grooves. Thus, a mobile base element which can support furniture can also be created, on which the portion of the furniture actually intended for presentation purposes can be disposed and moved by means of the rollers from one position to the next.

BRIEF DESCRIPTION OF THE DRAWINGS

Further advantages and details of the invention will be found in the following description of the figures. The schematic representations of the figures show.

DESCRIPTION OF PREFERRED EMBODIMENTS

Individual technical features of the following described example embodiments can also be combined in combination with the above-described example embodiments as well as the features of the independent claim and any other claims to produce objects according to the invention. When advisable, functionally equivalent elements shall be given the same reference numbers.

Figure 1:
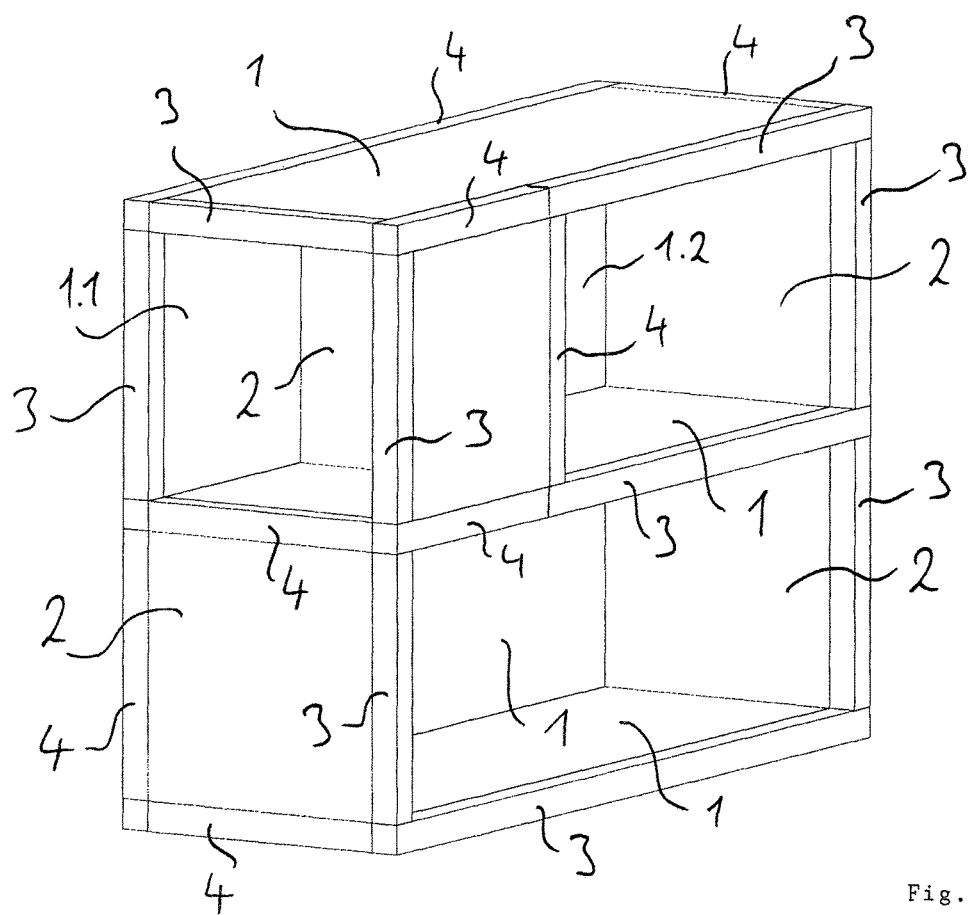
FIG. 1, an example embodiment of furniture according to the invention.

The furniture according to the invention, which in the present instance can be used as presentation furniture and especially as trade show shelving system, has according to FIG. 1 a series of different surfaces, connecting elements and closing elements, wherein surface elements are connected to connecting or closing elements via a groove structure present on surface elements in the form of double grooves and via a tongue structure present on connecting and closing elements in the form of a double tongue, and also via respective magnets.

In the present case, four identical surface elements 1 have been used to form two-level furniture. A further surface element 1.1 forms with a surface element 1.2 a further rear wall. The two levels of the furniture are furthermore bounded by other identically configured surface elements 2. Closing elements 3 cover the double grooves of the surface elements, which would otherwise be visible to an observer. By closing elements is defined here those elements which have a double tongue (or alternatively a double groove) only on one side and which have no functional elements on the other sides, especially no fittings or double groove or double tongues, or which do not serve for the connecting of two surface elements. Connecting elements 4 serve for the connecting of surface elements 1 or 2.

Figure 2:
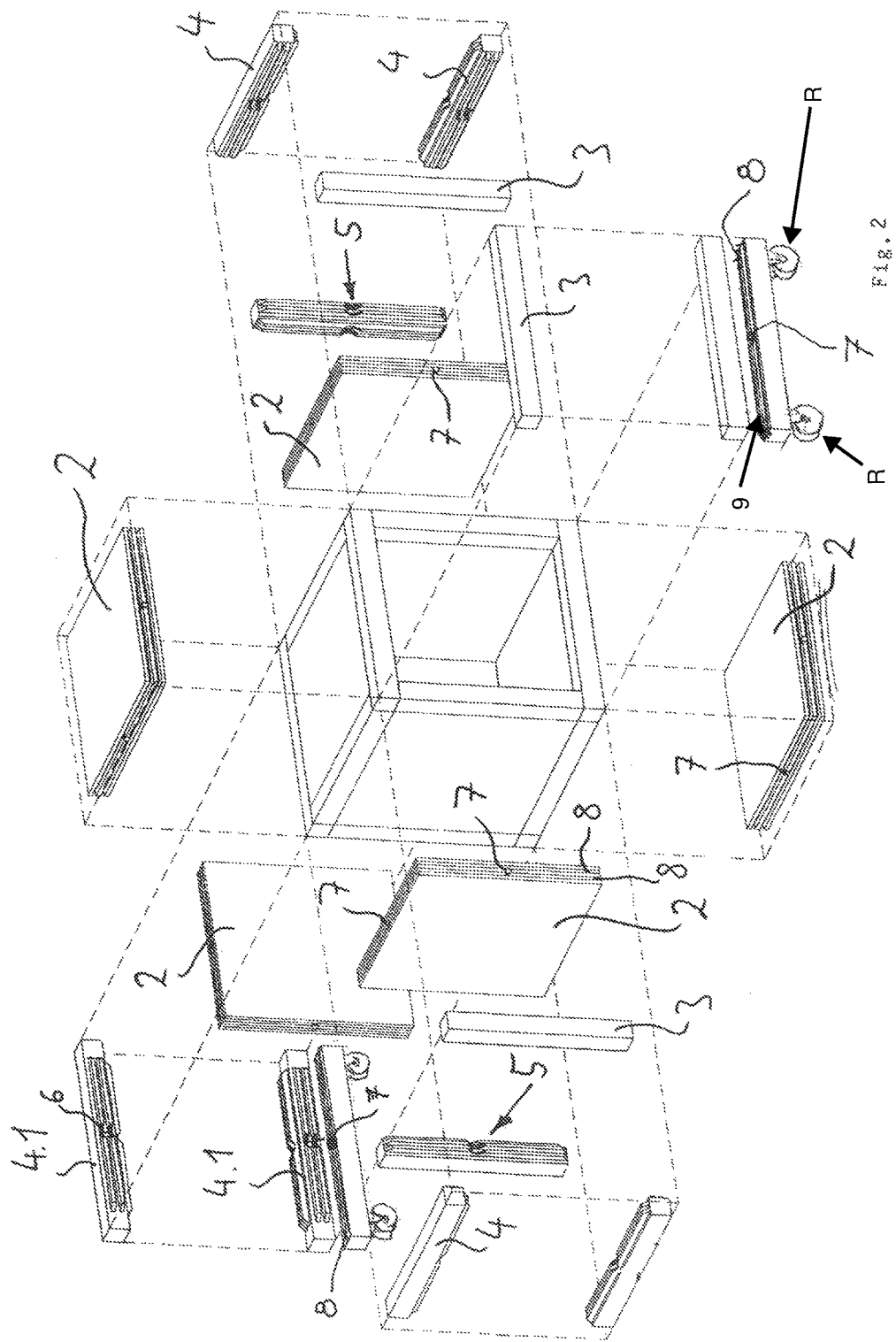
FIG. 2, an exploded representation of another example embodiment according to the invention, FIG. 3, two cross-sectional representations through a portion of an object according to the invention, FIG. 4, partial views of furniture elements of another object according to the invention, FIG. 5 a) to h), cross-sectional, representations of furniture elements of further objects according to the invention, FIG. 6 a) to l), examples of connecting elements of furniture according to the invention, FIG. 7, a perspective view of a furniture element, FIG. 8, a survey of sizes of presentation elements according to the invention.

In the more simply constructed example embodiment of FIG. 2, the surface and connecting elements are shown in exploded view. Here, a total of five surface elements 2 are joined together by connecting elements 4, the back connecting elements 4.1 having at the ends regions adjoining the beveled ends of the tongues, whose width corresponds to the cross-sectional width of the cuboidal base body, in order to cover the correspondingly adjoining connecting or closing elements. A furniture element is provided with at least one roller R and designed to be arranged at the bottom side. It is provided with a double groove 8 for arranging additional furniture elements, wherein at least one magnet 7 is disposed in the web 9 between the two grooves.

The connecting elements 4, just like the connecting elements 4.1, have a double tongue at sides adjoining each other, which engages in a corresponding double groove of the surface elements. Closing elements 3 have only one double groove at the side being closed and are formed with no tongue and groove on the side facing the observer, i.e., in the present instance, in the direction F. In regions 5 around the magnets of the connecting and closing elements, all double tongues are provided with recesses, which serve for the better guiding of the connecting and closing elements into the correct position at one end face of a surface element. Magnets 6 of the connecting and closing elements can be optimally positioned at magnets 7 of the surface elements. These magnets 7 are arranged in a web between two grooves 8 of a respective surface element.

Bevels of the tongues of the connecting elements 4, which are to be arranged for example on the right-hand side of the piece of furniture in the present case, abut with the tongues, not indicated in detail, of the closing element designated as 3 against the adjacent surface element in a miter.

Figure 3:
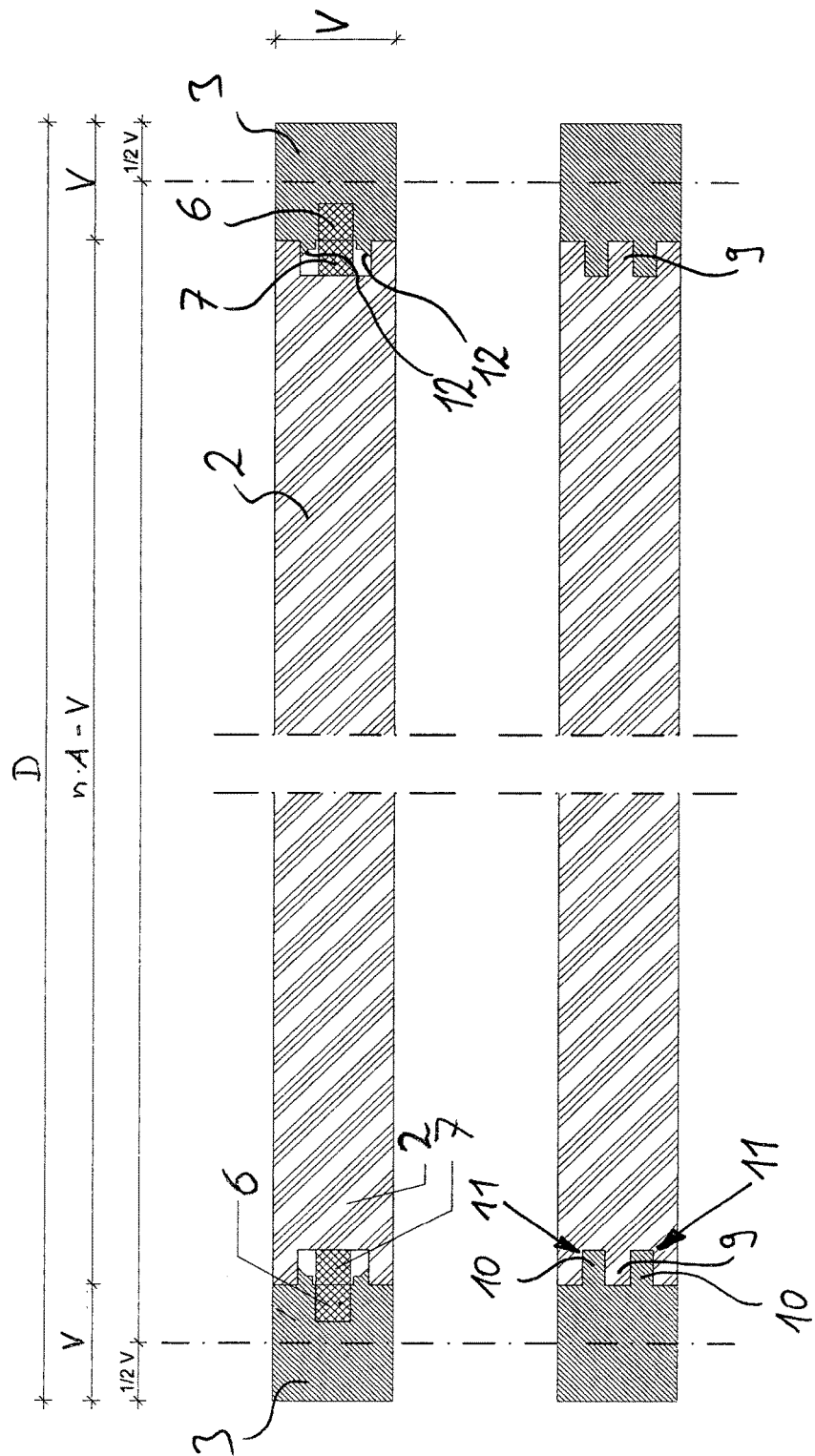

In the top cross-sectional representation of FIG. 3, the connection of two closing elements 3 with a surface element is shown. The sectioning line here runs at the height of the magnets. Magnets 6 lie tightly against magnets 7. Mutually attracting poles of the magnets are turned toward each other. The magnets 7 here are recognizably broader than a middle web 9, which serves to form two grooves 11 filled by tongues 10. Accordingly, the tongues 10 have recesses with guide surfaces 12, which serve for a positioning of the magnet 7 on the magnet 6. Immediately adjacent to the magnet 6, the guide surface forms an angle to produce a cylindrical (in the present case) entry region at the magnet 6.

The overall width D results here as n·A+V, while n·A−V is the width of the surface element 2. The base body of the closing element in the present case is cuboidal and its cross section is square with edge lengths V.

Figure 4:
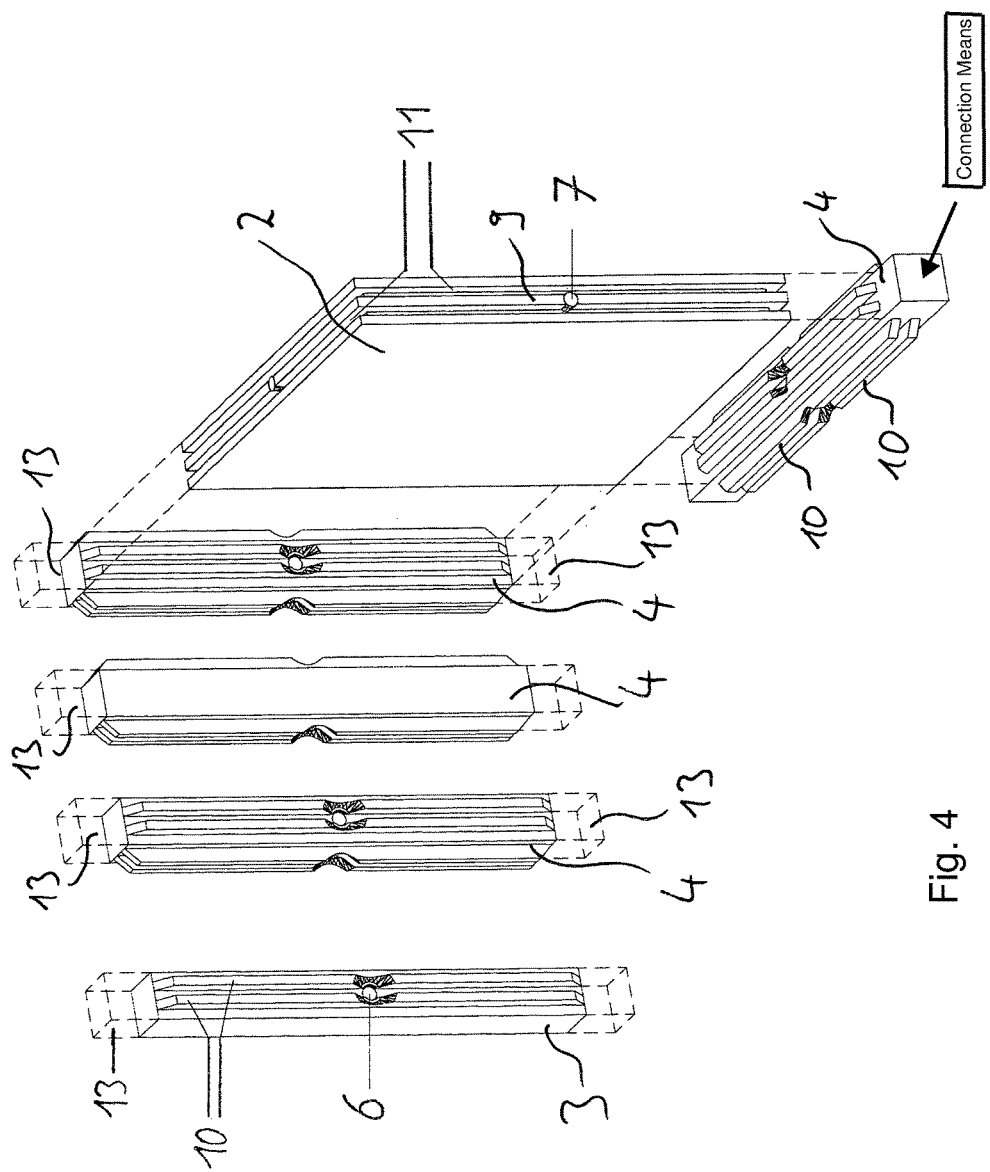

The greater width of the magnet 7 as compared to the width of the web 9 interrupted by it is also evident in FIG. 4. The magnet projects into the gap formed by the grooves 11 and makes it smaller.

While a connector 4 to be arranged at a lower end face of the surface element 2 has double tongues, formed by individual tongues 10, on a total of three sides, two other variants of a connecting element 4 shown in the same figure each have a double tongue on only two sides. Furthermore, these other connecting elements 4 do not have the regions 13 adjoining the beveled tongues and accordingly shown only by broken lines. These are likewise omitted in the case of the connector 4 provided with a double tongue on three sides, which can connect to the rear end face of the surface element 2 along a broken line in FIG. 4.

The same holds for a closing element 3, which is shown on the left in the figure.

The individual furniture elements, fashioned in particular as presentation furniture elements, which are designed as connecting or closing elements, can accordingly have different cross-sectional shapes (FIG. 5 a) to h)). A closing element 3, as already described, has only one double groove for connection to a surface element 2 (FIG. 5 a)).

Two surface elements 2 can be joined, across a connecting element 4 forming a corner connector, wherein then the connecting element 4 has a double groove on two mutually adjoining sides (FIG. 5 *b*)).

Double grooves on opposite sides of a connecting element 4 serve to form surfaces of two neighboring surface elements 2 which pass flush one into the other (FIG. 5 *c*)).

A connecting element 4 configured to form a T-shaped connection has double grooves on three sides (FIG. 5 *d*)). A connecting element 4 with double grooves on its four right-angled abutting sides is designed to produce a cross-shaped connection of neighboring surface elements 2 joined across a corner (FIG. e)).

A closing element 3 has a cable groove 14, in which current conducting lines 15 are arranged (FIG. 5 *f*)).

Figure 5:
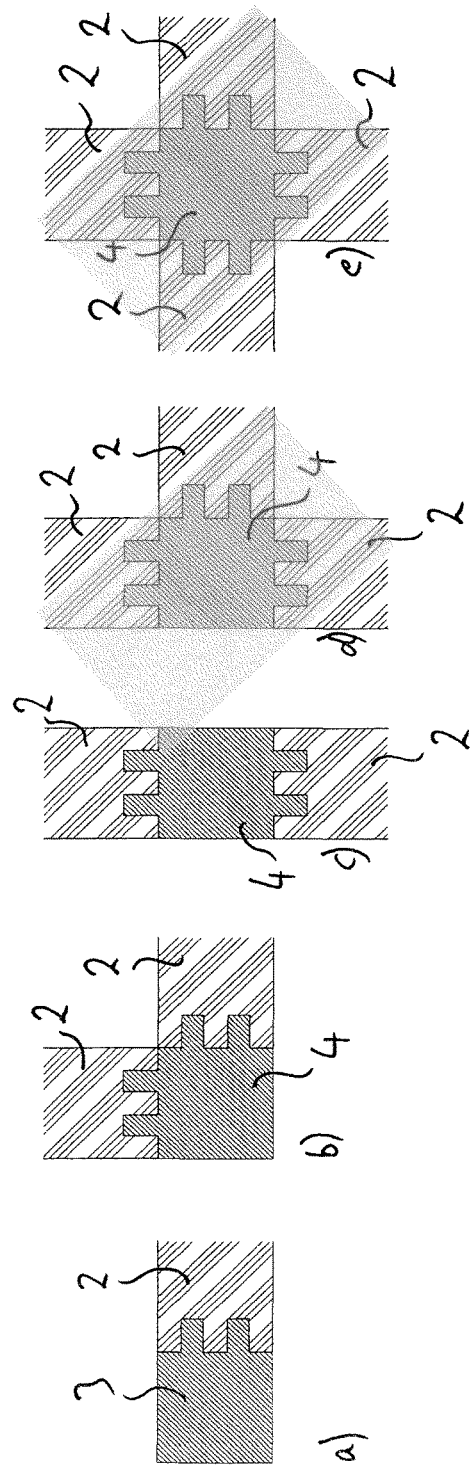
Figure 5:
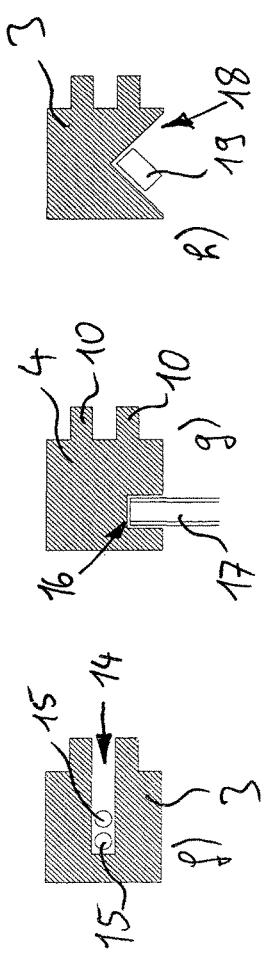

A connecting element 4 according to FIG. 5 *g*) has a double tongue formed with tongues 10 on one side, while on another side a groove 16 is present for the arrangement of a functional element preferably configured as a glass plate 17.

Finally, the closing element 3 of FIG. 5 *h*) comprises a recess 18, in which a lighting means 19 preferably configured as an LED strip is placed.

This LED strip can be supplied with power for example across adjoining closing elements 3 per FIG. 5 *f*).

Figure 6:
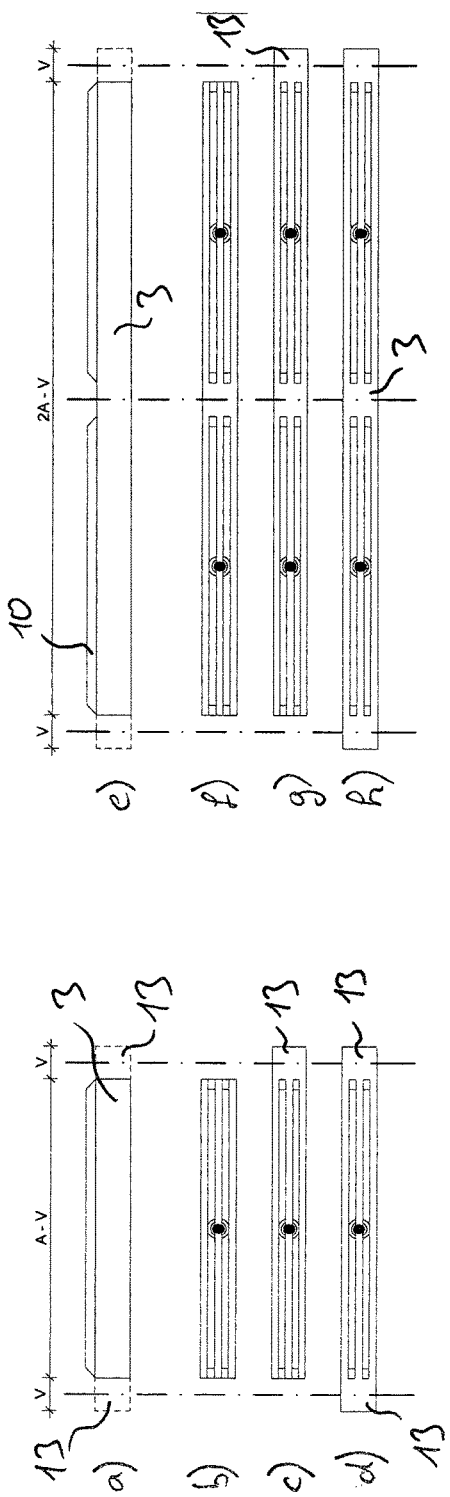
Figure 6:
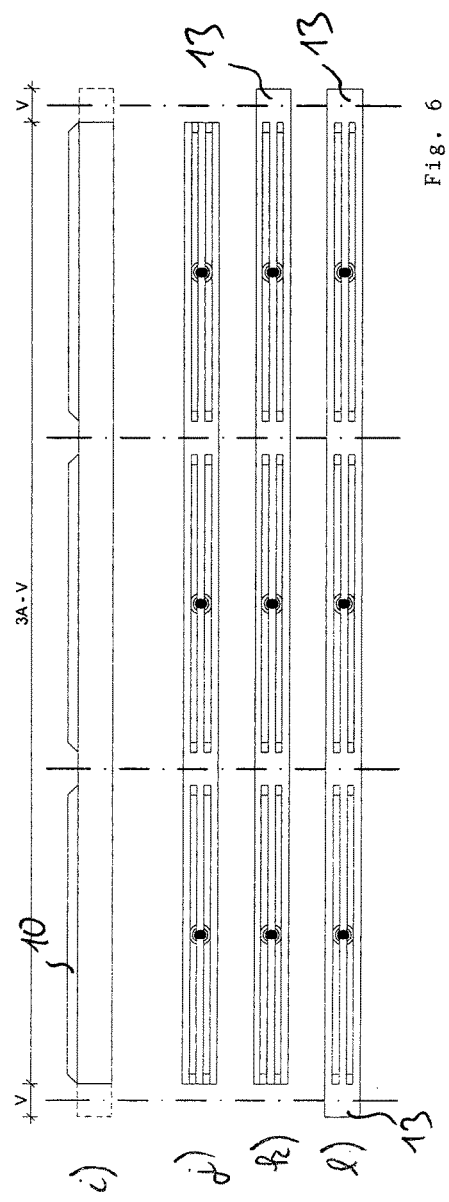
Figure 8:
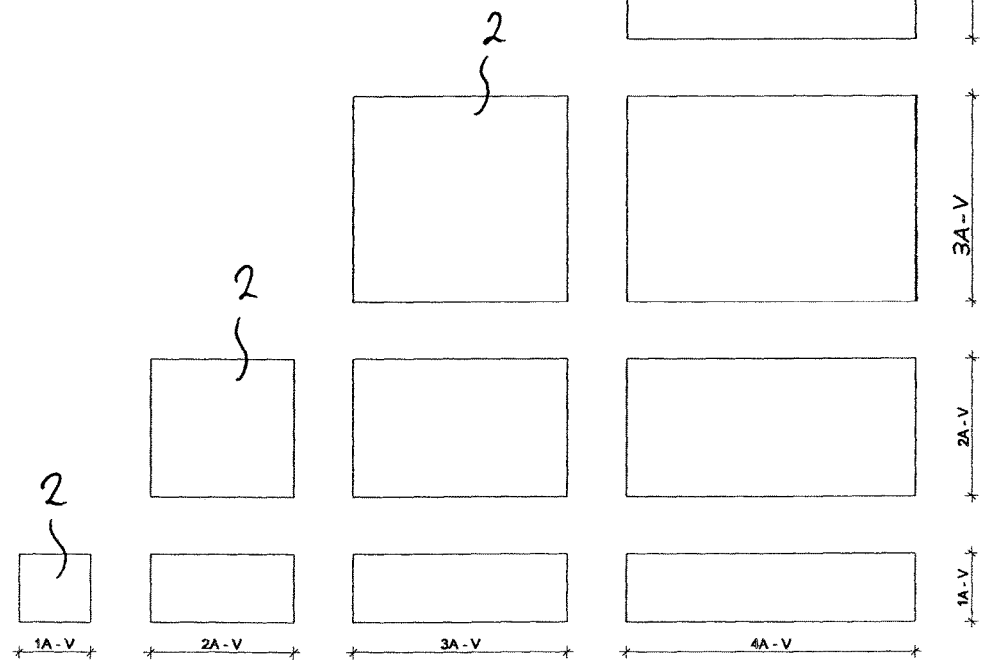

Example embodiments of closing elements 3 for different module sizes, making possible a modular design and the connection to different sized surface elements, are shown in FIG. 6 *a*) to 6 *l*). The closing elements shown there differ especially in regard to a region 13 adjoining the region provided with grooves. What is essential in all the example embodiments shown in FIGS. 6 and 8 is that the positions of the magnets match up when respective connecting or closing elements are arranged at corresponding surface elements. Accordingly, a closing element 3 shown in FIG. 6 *a*) is provided with two adjoining regions, shown by broken lines, FIG. 6 *b*) shows such a closing element in a side view without the regions 13 (length A–V), FIG. 6 *c*) an example with only one adjoining region 13 (length A), while the length of the closing element per FIG. 6 *d*) results as A+V.

A next longer closing element in the side view of FIG. 6 *e*) has a basic length of 2 A–V (see FIG. 6 *f*)). The tongues 10 forming a double tongue here are interrupted in the middle region in order to enable the arrangement of additional elements. Accordingly, the recess formed by the tongues is at least as broad as a cross-sectional width of a base body of an adjoining connecting element. In order to make possible a mitered fit, the recesses are beveled, as are the ends of the tongues.

The example embodiments per FIGS. 6 *g*) and *h*) likewise differ again by the regions 13 adjoining the tongues, where the closing strip per FIG. 6 *g*) has a length of 2 A and the example embodiment of FIG. 6 *h*) has a length of 2 A+V.

Instead of closing strips 3, the example embodiments of FIG. 6 *a*) to 6 *l*) can also involve connecting elements having at least two sides of double tongues. The arranging of several magnets on one connecting or closing element side is done at an average spacing A (from center axis to center axis of the neighboring magnets).

A closing element with a basic length of 3 A–V is shown in side view in FIG. 6 *i*). According to the modular design of the furniture according to the invention, there are two regions of interrupted webs 10 here, serving for the connection of closing or connecting elements.

The basic element of this next longer closing element has a length of 3 A–V (FIG. 6 *j*)). Accordingly, the example embodiments of FIGS. 6 *k*) and 6 *l*), increased in length by one or two regions 13 respectively, are provided with a length of 3 A or 3 A+V, respectively.

Figure 7:
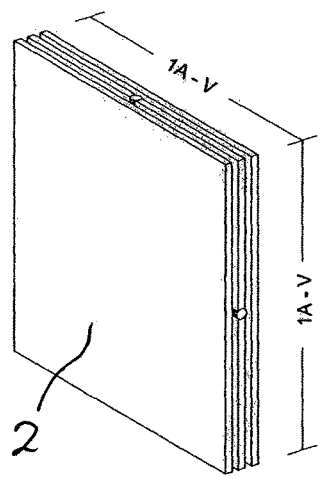

As the basic size for surface elements, a surface element 2 is provided with an edge length of (1) A–V (FIG. 7).

Starting from this size, additional sizes of surface elements 2 with sizes n·A–V for the respective edge lengths are depicted accordingly in FIG. 8, where n is formed by the set of whole numbers ({1, 2, 3, . . . }).

Using the connecting, closing and surface elements of FIG. 5-7, a variety of furniture according to the invention which can be assembled and disassembled without tools can be created, which can be used for example at trade shows, in the construction of shops, at exhibitions, in store fixtures, for events, for visual marketing, for retail technology and/or for personal residential use.

What is claimed is:

1. A furniture comprising a plurality of furniture elements, the furniture elements including surface elements (1, 2), each surface element comprising a magnetically attractable counter part, and further including connecting elements (4), wherein the connecting elements (4) each comprise at least one magnet and further each comprise at least two sides configured to be mounted on narrow sides of the surface elements (1, 2) by a tool-free detachable tongue and groove connection comprising a groove structure and a tongue structure to be inserted in a direction of insertion into the groove structure, wherein the direction of insertion is perpendicular to a longitudinal extension of the groove structure and parallel to an area dimension of the surface elements (1,2), and wherein two of the surface elements are connected to each other by a single one of the connecting elements and are secured by the tongue and groove connections transversely to the area dimension of the surface elements (1, 2), and wherein the tongue and groove connections are secured against separating in a direction opposite to the direction of insertion by an interaction of the at least one magnet (6), arranged on the single one of the connecting elements (4) connecting the two surface elements to each other, with the magnetically attractable counter part of the two surface elements, such that the two surface elements (2, 1) are arranged next to each other or are arranged directly across a corner, joined only by the single one of the connecting elements (4).

2. The furniture as claimed in claim 1, wherein the magnetically attractable counter part is a magnet (7).

3. The furniture as claimed in claim 1, wherein the tongue structure of the tongue and groove connections is arranged on the connecting elements (4).

4. The furniture as claimed in claim 3, wherein the tongue structure of the tongue and groove connections is beveled toward its ends.

5. The furniture as claimed in claim 1, wherein the connecting elements (4) are provided with a polygonal base body.

6. The furniture as claimed in claim 1, wherein the tongue structure of the tongue and groove connections is arranged on the connecting elements (4) and/or the at least one magnet (6) of the connecting elements (4) is arranged symmetrically to the tongue structure.

7. The furniture as claimed in claim 1, wherein the connecting elements (4) each are provided with a base body and wherein the at least one magnet (6) is recessed into the base body.

8. The furniture as claimed in claim 7, wherein the tongue structure around the at least one magnet has at least one recess running toward the at least one magnet (6), wherein the at least one recess comprises groove surfaces forming the at least one recess and wherein the groove surfaces are configured as guide surfaces.

9. The furniture as claimed in claim 1, wherein one or more of the connecting elements (4) are provided with a cable groove (14) in which a current conducting line (15) is arranged.

10. The furniture as claimed in claim 9, wherein connection means for connecting to the current conducting line (15) are located on at least one end face of the connecting elements (4).

11. The furniture as claimed in claim 1, wherein one or more of the furniture elements are provided with a lighting means (19).

12. The furniture as claimed in claim 1, wherein one or more of the connecting elements (4) are provided with a fitting for a door.

13. The furniture as claimed in claim 1, wherein the surface elements (1, 2) have a polygonal basic shape.

14. The furniture as claimed in claim 1, wherein the groove structure of the tongue and groove connections is arranged on at least one of the narrow sides of the surface elements.

15. The furniture as claimed in claim 14, wherein a central web (9) situated between grooves (11) of the groove structure is provided with the magnetically attractable counter part that is a magnet (7).

16. The furniture as claimed in claim 15, wherein the magnetically attractable counter part is broader than the web (9).

17. The furniture as claimed in claim 1, wherein one or more of the surface elements (1, 2) are at least partly transparent in design.

18. The furniture as claimed in claim 1, further comprising a closing element (3) comprising a first side to be facing an observer, wherein the first side is configured without tongues and grooves.

19. The furniture as claimed in claim 18, wherein the closing element (3) has a second side comprising a tongue structure which is beveled at opposite ends of the tongue structure.

20. The furniture as claimed in claim 19, which has at least one magnet disposed symmetrically to the tongue structure.

21. The furniture as claimed in claim 18, wherein the connecting elements (4), the closing element (3), or the surface elements (1, 2) have a groove (16) and/or a recess for the arrangement of a functional element.

22. The furniture according to claim 18, wherein a first one of the connecting elements or the closing element (3, 4) has a region (13) adjoining the respective tongue structure, wherein the region has a length V that corresponds to a cross-sectional width of a base body of the first one of the connecting elements or the closing element (3, 4).

23. The furniture as claimed in claim 2, wherein the at least one magnet and the magnetically attractable counter part have a smaller cross-sectional width than the connecting elements (4) and are cylindrical in design.

24. The furniture as claimed in claim 1, wherein one or more of the furniture elements are provided with at least one roller and designed to be arranged at a bottom side of the furniture and provided with a groove structure comprising two grooves for arranging additional furniture elements, wherein at least one magnet is disposed in a web between the two grooves of the groove structure.

25. The furniture as claimed in claim 24, wherein the one or more furniture elements provided with the at least one roller are connected by wooden webs, which are provided with a groove structure, wherein at least one magnet is disposed in a web between two grooves of the groove structure.

26. The furniture according to claim 1, wherein the tongue structure comprises one or more tongues and the groove structure comprises one or more grooves, wherein the one or more tongues are to be inserted into the one or more grooves to establish the tongue and groove connection.

27. The furniture according to claim 1, wherein the tongue structure is a double tongue and the groove structure is a double groove, wherein the double tongue is to be inserted into the double groove to establish the tongue and groove connection.

* * * * *